United States Patent [19]

Fitz et al.

[11] Patent Number: 4,713,733

[45] Date of Patent: Dec. 15, 1987

[54] CIGAR LIGHTER INCORPORATING GLOW RING

[75] Inventors: Edward J. Fitz, Fairfield; Dominic Pesapane, West Haven, both of Conn.

[73] Assignee: Casco Products Corporation, Bridgeport, Conn.

[21] Appl. No.: 30,156

[22] Filed: Mar. 25, 1987

[51] Int. Cl.⁴ .............................................. F21V 33/00
[52] U.S. Cl. ...................................... 362/80; 219/220; 219/369; 362/32
[58] Field of Search ................... 362/80, 32; 219/360, 219/361, 362, 363, 364, 365, 366, 367, 368, 369, 220

[56] References Cited

U.S. PATENT DOCUMENTS

| | | | |
|---|---|---|---|
| 2,276,982 | 3/1942 | Johnson | 219/269 |
| 2,419,950 | 5/1947 | Johnson | 362/80 |
| 2,692,938 | 10/1954 | Cone | 362/32 |
| 2,701,297 | 2/1955 | Thibault | 362/32 |
| 3,903,404 | 9/1975 | Seibel | 219/267 |
| 4,079,242 | 3/1978 | Seibel | 362/32 |
| 4,500,774 | 2/1985 | Honjo | 219/269 |

Primary Examiner—Ronald B. Cox
Attorney, Agent, or Firm—Mitchell D. Bittman

[57] ABSTRACT

A cigar lighter assemblage for mounting through an opening of a vehicle dashboard from the front thereof, including a tubular socket having an opening for receiving an ignitor plug, a light-conducting bushing surrounding the socket and constituting a bezel therefor, and a lamp-holder carried by the bushing. There are cooperable structures on the bushing and holder for slidably mounting the latter on the bushing, and enabling it to move between an extended position and a retracted position. The lamp holder has a projection for engagement with the panel, which functions to shift the holder from its extended position to its retracted position as the bushing is being frontally inserted in the panel. An especially simple arrangement results, characterized by both manufacturing economy and ease of assembly.

31 Claims, 23 Drawing Figures

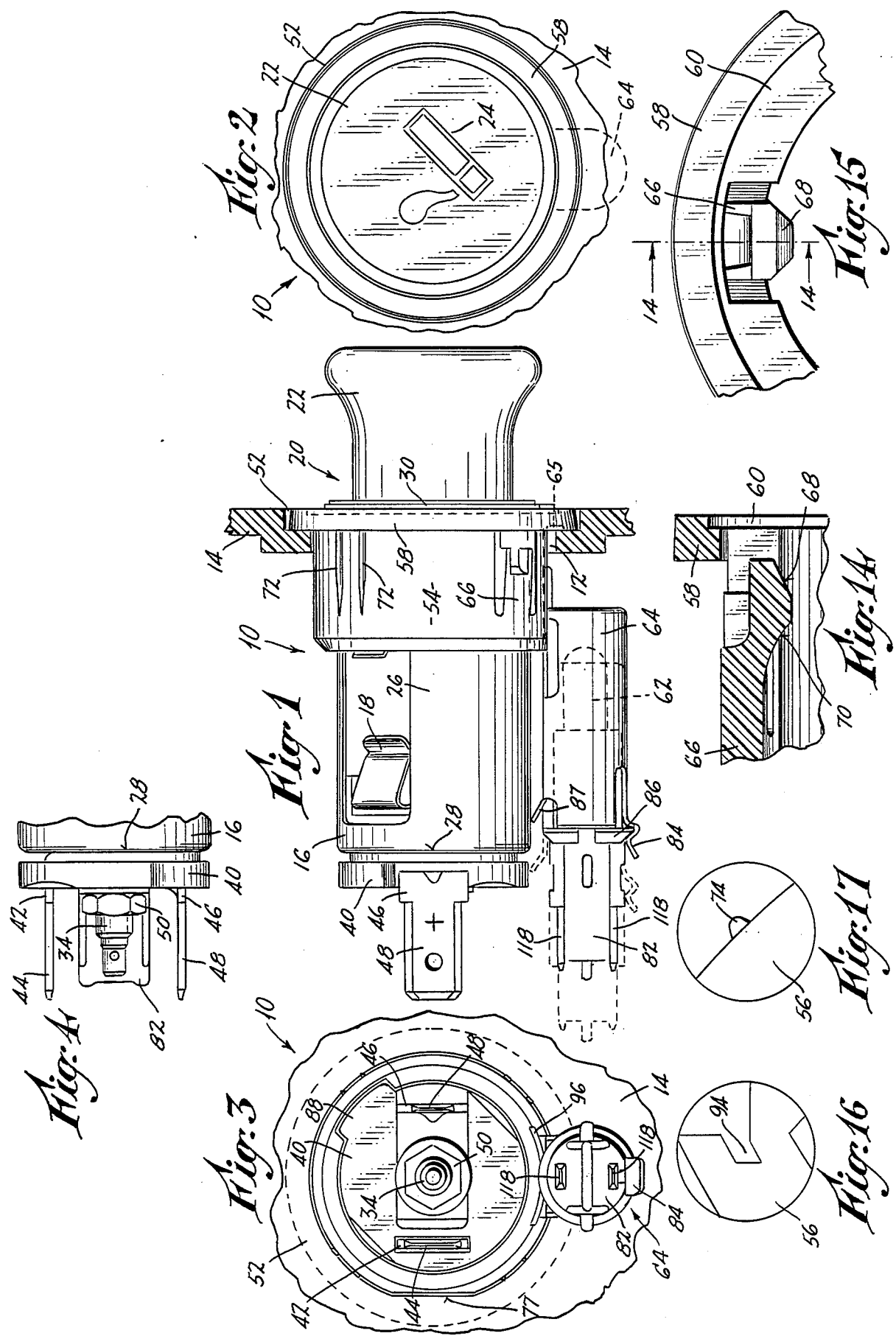

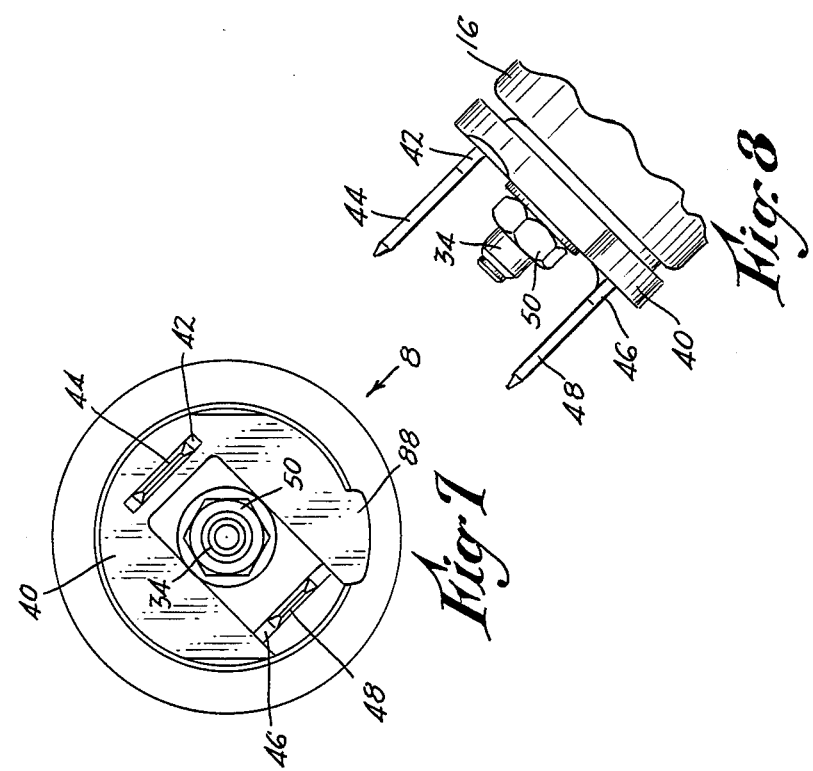
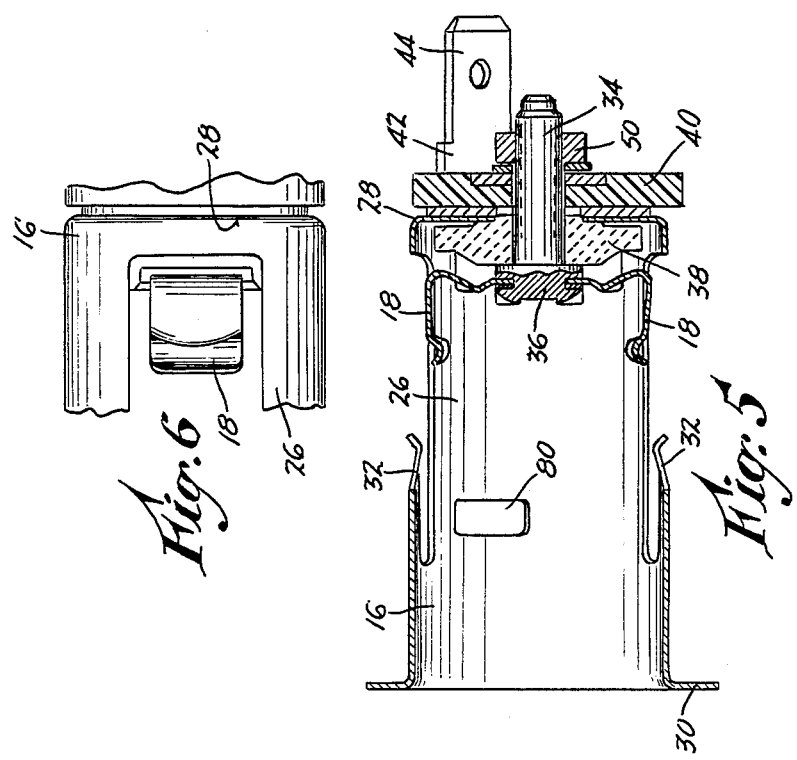

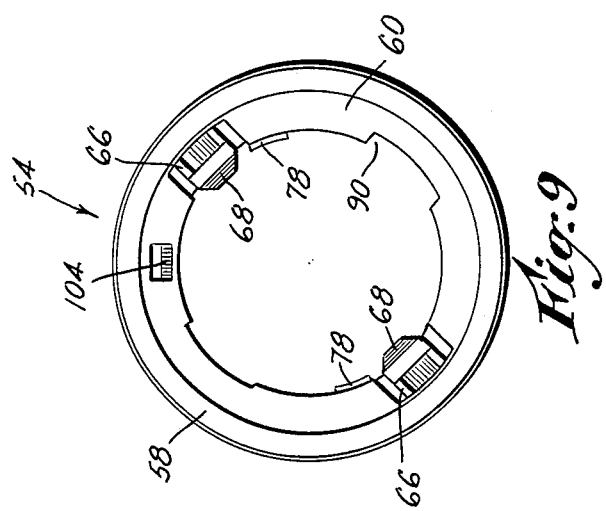
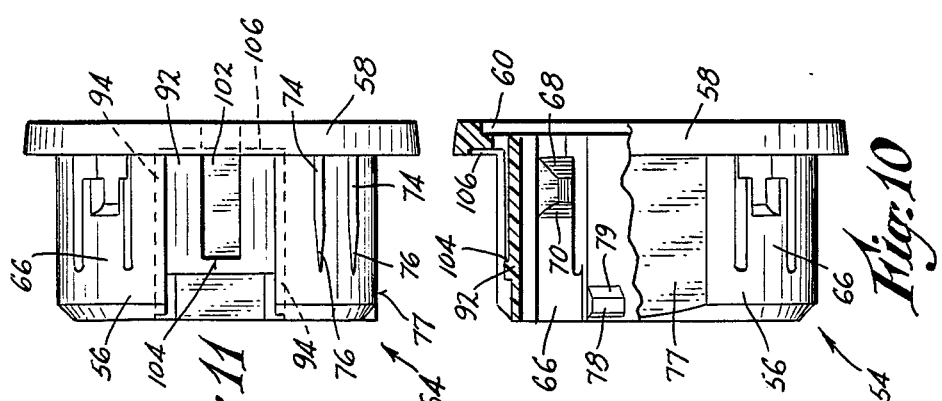
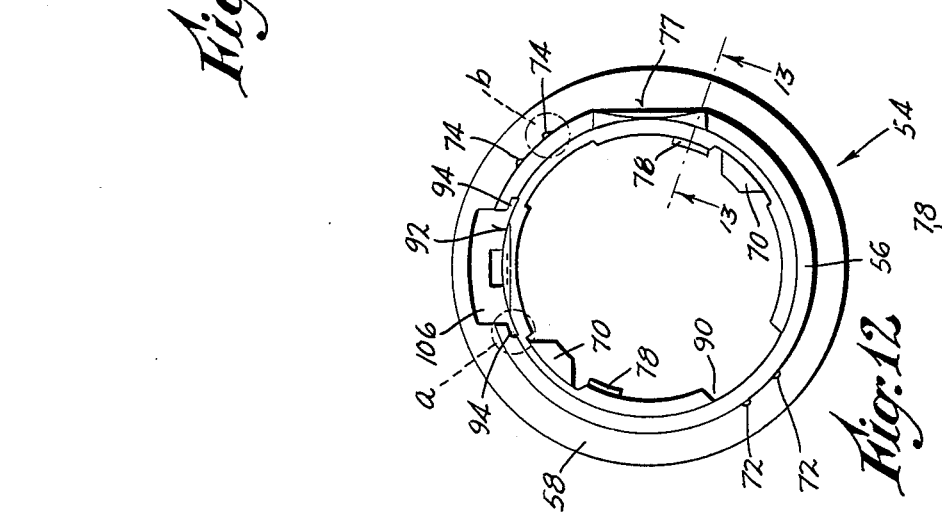

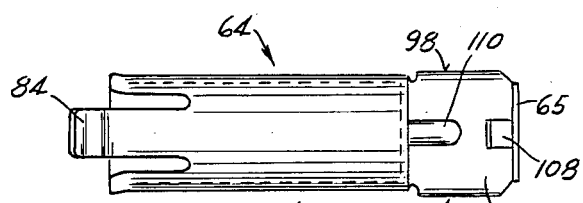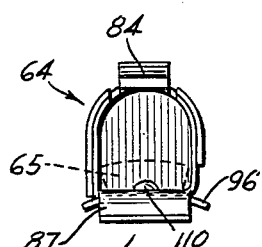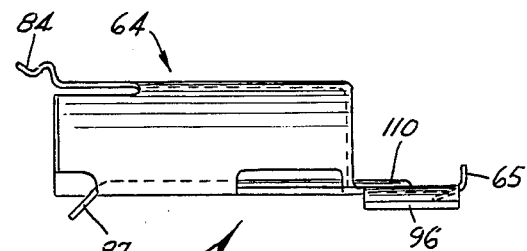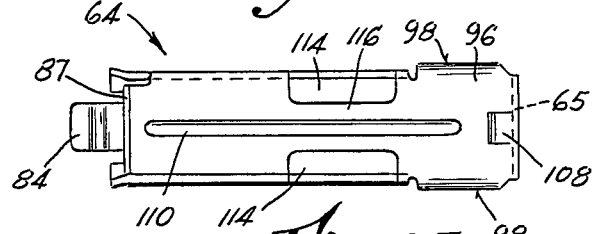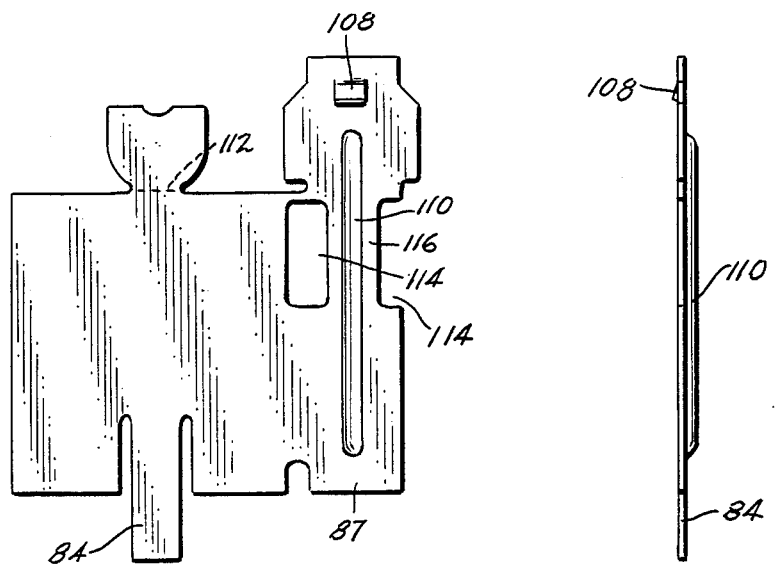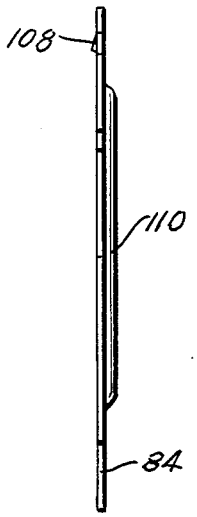

CIGAR LIGHTER INCORPORATING GLOW RING

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

BACKGROUND OF THE INVENTION

1. Field of the Invention

This invention relates generally to cigar lighters, and more particularly to devices of the type incorporating a socket or well that carries a removable ignitor plug, and wherein the well has a transparent or semi-transparent "glow ring" surrounding it and which is illuminated by a lamp at the rear of the mounting panel that carries the socket.

2. Description of the Related Art Including Information Disclosed Under 37 CFR §§1.97–1.99

A number of cigar lighters incorporating illuminated "glow rings" have been proposed and produced, and have met with varying degrees of success.

German Pat. No. 25 35 080 illustrates one construction, involving a tubular ring body having a rearwardly extending projection which carries a lamp socket, and wherein light from the lamp is channelled through the projection and into the ring body, toward the front periphery thereof. Similar constructions are illustrated in German Pat. No. 2,254,712 and British Pat. No. 1,381,060. Several of the disclosed devices were capable of being assembled into an automobile dashboard from the front, thus simplifying installation, for some applications.

Other constructions are illustrated in U.S. Pat. Nos. 2,237,250; 2,648,758; 2,692,938 and 4,079,242. The present invention relates to improvements in the above identified lighter constructions.

SUMMARY OF THE INVENTION

The present invention provides a novel and improved cigar lighter construction incorporating a glow ring, which is both simple in its structure and inexpensive to manufacture.

A related object of the invention is to provide an improved cigar lighter as above characterized, wherein the various components can be economically fabricated, thereby maintaining the overall manufacturing cost as low as possible.

Still another object of the invention is to provide an improved cigar lighter of the kind indicated, wherein the device can be readily installed from the front of an automobile dashboard.

Yet another object of the invention is to provide an improved cigar lighter as above set forth, wherein optimum light is transmitted from a bulb mounted at the rear of the automobile dashboard, to provide a pleasing, soft glow or "halo" around the periphery of the cigar lighter well or socket.

The objects are accomplished by the provision of a cigar lighter assemblage for mounting through an opening of a panel, from the front thereof, comprising a tubular socket having an opening for receiving an igniting unit, a light-conducting bushing surrounding the socket and constituting a bezel therefor, and a lamp holder carried by the bushing. There are cooperable means on the bushing and holder for slidably mounting the latter on the bushing, and enabling it to move between an extended position and a retracted position. The lamp holder has means for engagement with the panel, to shift the holder from its extended position to its retracted position as the bushing is being frontally inserted in the panel aperture. An especially simple arrangement results, characterized by both manufacturing economy and ease of assembly.

Other features and advantages will hereinafter appear.

BRIEF DESCRIPTION OF THE DRAWINGS

In the drawings, illustrating a preferred embodiment of the invention:

FIG. 1 is a side elevation of the improved cigar lighter of the present invention, shown with the glow ring installed in an opening in a dashboard or other panel of a vehicle, and with the cigar lighter socket mounted in the ring and carrying a removable ignitor plug. A lamp housing is slidably mounted on the ring and disposed at the rear of the dashboard.

FIG. 2 is a front elevation of the cigar lighter of FIG. 1, particularly showing the peripheral mounting flange of the glow ring, and the knob of the ignitor plug.

FIG. 3 is a rear elevation of the cigar lighter of FIGS. 1 and 2, particularly illustrating the inner end of the lighter socket and the rear of the lamp housing.

FIG. 4 is a fragmentary top plan view of the rear portion of the socket and lamp housing of the lighter of FIGS. 1–3.

FIG. 5 is an axial section of the socket per se of the cigar lighter of FIGS. 1–4.

FIG. 6 is a fragmentary top plan view of the socket of FIG. 5.

FIG. 7 is a rear elevation of the socket of FIGS. 5 and 6.

FIG. 8 is a fragmentary side view looking in the direction of the arrow 8 of FIG. 7.

FIG. 9 is a front elevation of the glow ring portion of the cigar lighter of FIGS. 1–3.

FIG. 10 is a view, partly in side elevation and partly in axial section, of the glow ring of FIG. 9.

FIG. 11 is a top plan view of the glow ring of FIGS. 9 and 10.

FIG. 12 is a rear elevation of the glow ring of FIGS. 9–11.

FIG. 13 is a fragmentary section taken on the line 13—13 of FIG. 12.

FIG. 14 is a fragmentary section, enlarged, of a portion of the glow ring, similar to the showing of FIG. 10. The section is taken on the line 14—14 of FIG. 15.

FIG. 15 is a fragmentary front elevation of the glow ring of FIGS. 9–14, showing details of an integral spring finger employed to retain the ring and socket in position in a dashboard or panel.

FIG. 16 is a detail of a portion of the glow ring, corresponding to the area designated in FIG. 12 by one of the small circles indicated at "a" in dotted outline.

FIG. 17 is a detail of a portion of the glow ring, corresponding to the area designated in FIG. 12 by the small circle indicated at "b" in dotted outline.

FIG. 18 is top plan view of a flat sheet metal blank stamped from a piece of sheet metal stock. The blank is shown prior to its being formed into a housing for a lamp that provides illumination of the glow ring.

FIG. 19 is a right edge view of the blank of FIG. 18.

FIG. 20 is a side elevation of the lamp housing formed from the blank of FIGS. 18 and 19, and which is shown in FIG. 1 as being supported at the side of the cigar lighter socket.

FIG. 21 is a left end elevational view of the lamp housing of FIG. 20.

FIG. 22 is a top plan view of the lamp housing of FIGS. 20 and 21, and

FIG. 23 is a bottom plan view of the lamp housing of FIGS. 20-22.

DESCRIPTION OF THE PREFERRED EMBODIMENT

Referring first to FIGS. 1-3 there is illustrated a cigar lighter assemblage designated generally by the numeral 10 and mounted in an opening 12 of a panel such as the dashboard 14 of an automotive vehicle. The assemblage comprises a lighter socket or well 16 having the usual bimetallic spring contact fingers 18 that grasp and establish electrical contact with the heating element cup (not shown) of an ignitor plug 20 when the latter is fully depressed in the socket 16. In FIG. 2, the knob 22 of the ignitor plug 20 is shown as having an outline 24 representing a cigarette, and smoke emanating from the burning tip thereof.

The socket or well 16 can be of conventional construction. In FIG. 5 the socket 16 is seen as comprising a drawn sheet metal shell having an apertured side wall 26, an apertured bottom wall 28 and a front peripheral outturned flange 30. Oppositely disposed resilient spring fingers 32 are struck from the side wall 26, and are engageable with an annular rib or bead (not shown) on the ignitor plug 20, all in the usual manner. The bimetallic fingers 18 are mounted on a threaded stud 34 having a staked head portion 36. The stud passes through the bottom wall 28 of the socket 16, and through two insulating members 38, 40 disposed respectively on opposite sides of the bottom wall 28. The inner insulating member 38 is disk-like, having a central aperture to accommodate the stud 34. Mounted against the outer surface of the bottom wall 28 is a terminal 42 having a connector portion in the form of a spade lug 44. A second terminal 46, also having a portion constituted as a spade lug 48, is mounted on the threaded stud 34 by a nut 50 and lockwasher. The two terminals 42, 46 are electrically isolated from one another by the second insulating member 40. The first terminal 42 electrically contacts the socket walls 26, 28, whereas the second terminal 46 is connected with the bimetallic fingers 18, enabling an electrical path to be established through the ignitor plug heating element when the plug 20 is depressed.

As shown, the panel or dashboard 14 has a recess 52 in which there is received a frontal flange 58 of a tubular bushing or ring 54, commonly referred to in the cigar lighter field as a "glow ring". The ring 54 has a tubular body portion 56 of generally cylindrical shape, the body portion 56 and a frontal flange 58 being integrally formed with one another. Disposed inside the flange 58 and at the front of the ring is an annular recess 60 in which the outturned flange 30 of the socket 16 is received, as shown in FIG. 1.

In accordance with the present invention there is provided a novel and improved arrangement for mounting both the glow ring 54 and cigar lighter socket 16 in the aperture 12 of the panel 14, with the frontal flange 58 of the ring 54 surrounding the outturned flange 30 of the cigar lighter socket 16, and wherein a slidably mounted illuminating means that is provided on the ring 54 channels light to the frontal flange 58 and thus imparts a soft glow thereto when the illuminating means is energized. In addition, the mounting arrangement is such that both the ring 54 and socket 16 are installed from the front of the panel 14, thereby dispensing with the need for additional clamping mechanisms such as threaded clamp shells and the like. Also, there is eliminated the need for providing a separate thread form at the base of the socket 16, adjacent the terminals 42, 46 thereof.

Further in accordance with the invention the novel slide mounting for the illuminating means, comprising a lamp 62 and lamp housing 64 is so arranged that the ring and lamp housing 64 can be frontally inserted into the panel aperture 12 first, and thereafter the cigar lighter socket 16 passed through the ring 54 from the front. As the ring 54 is being thus seated, an abutment or tab 65 carried by the lamp housing 64 engages an edge portion of the panel aperture 12, and when the ring 54 is shifted rearwardly, the lamp housing 64 is held stationary with respect to the panel 14 by the abutment 65, and remains at a location with respect to the panel wherein it underlies the body 56 of the ring, as shown in FIG. 1.

The ring 54 is preferably molded as a single piece. A pair of oppositely-disposed spring fingers 66 is provided, extending from the rear of the ring 54 toward the front thereof. On the inner end or extremity of each finger 66 is a camming lug having forwardly and rearwardly facing camming surfaces 68, 70, respectively. The camming surfaces 68, 70 project inwardly a slight extent beyond other adjacent portions of the cylindrical inner wall of the ring 54. The surfaces 68 of the camming lugs are adapted for engagement by the outer surface of the cigar lighter socket side wall 26 when the latter is frontally inserted into the ring 54, resulting in outward camming movement of the fingers 66. The ends of the fingers arrive at positions wherein they lie behind the edge portions of the panel aperture 12, which results in an essentially permanent retention of the ring 54 in the aperture 12.

On opposite sides of the outer surface of the ring body 56 are two pairs 72, 74 of longitudinal ribs. They have tapered portions, one pair of ribs being shown in FIG. 11, and the tapered portions being indicated 76. These ribs 72, 74 assist in centering of the ring 54 in the panel aperture 12 during initial installation of the ring 54, by minimizing looseness that arises from differences between the outer diameter of the ring and the diameter of the panel aperture 12. A flat 77 on the ring 54 keys it to a corresponding flat portion (not shown) of the aperture 12.

The inner surface of the ring has additional camming projections 78, FIGS. 10, 12 and 13, having cam surfaces 79, the projections being cooperable with the edges of apertures 80 provided in the side walls of the cigar lighter socket 16. When the socket 16 is inserted into the ring 54 (which has already been installed in the dashboard 14), the projections 78 are received in the apertures 80, to thereby retain the socket 16 in its intended position, once seated.

The lamp housing 64 provides a releasable mounting for the lamp 62 and a lamp socket 82. The housing has a spring finger 84 that engages a shoulder 86 on the exterior of the lamp socket 82, as shown in FIG. 1. Also, the lamp housing 64 has a downwardly bent angular tab 87 that slidably bears against the outer surface of the socket side wall 26. This tab 87 has been omitted from FIG. 3, in the interest of clarity.

By the invention, means are also provided for turnably positioning the socket 16 prior to its insertion into the glow ring 54. In accomplishing such positioning, the insulating member 40 has a tongue or side projection 88, and the ring 54 has a cooperable groove 90 in the inner surface of its body 56, that can accept the tongue 88 when it is aligned with the groove 90. The tongue 88 is particularly shown in FIG. 7 and the groove in the ring 54 shown in FIGS. 9 and 12.

Referring now to FIGS. 11 and 12, by the invention the body 56 of the glow ring 54 has an exterior track 92 with opposite, longitudinal grooves 94, FIGS. 12 and 16, that extend parallel to the axis of the ring 54 and to one another. Cooperable with the track 92 of the ring body 56 is a slide 96, FIGS. 20-23, which carries the lamp housing 64. The slide 96 is constituted as a strip of metal integral with the remainder of the housing 64, having opposite edge portions 98 which are respectively received in the grooves 94 of the track 92, with a friction fit. The transverse cross section of the slide 96 is slightly bowed and the edges 98 of the slide 96 engage the walls of the grooves 94. The tab 65 at the front of the slide 96 is engageable with the edges of the dashboard aperture 12, as will be explained below.

The slide 96 contains a longitudinal recess 102, FIG. 11, having an abutment wall 104 at its rear end. The forward end of the longitudinal recess 102 extends toward the bottom of the recess 60, FIG. 10, at the front of the ring 54, and forms a small angular recess 106, as in FIG. 12. A transverse projecting tooth 108, struck from the slide 96 during the stamping operation that produces the blank of FIG. 18, moves along the longitudinal recess 102 as the lamp housing 64 is shifted with respect to the body 56 of the ring 54. The engagement of this tooth 108 with the abutment wall 104 near the rear end of the recess 102 prevents inadvertent release of the slide 96 from the ring 54 once the lamp housing 64 and ring have been assembled.

The recess 106 in the ring 54 constitutes a clearance space for the tab 65 at the front of the track 92. This tab 65 engages a front surface of the edge of the dashboard aperture 12 as the ring 54 is being installed.

FIGS. 18 and 19 show the lamp housing during its formation from a sheet metal stamping, and FIGS. 20-23 show the lamp housing 64 assembled. A stiffening rib 110 is imparted to the component during the stamping procedure, as is the tooth 108. Thereafter, the stamping is folded along several longitudinal lines, and one transverse line 112, to form the housing of FIGS. 20-23. As can be readily understood, the fold along the transverse line 112 forms the rear end wall of the housing 64.

Two cut-outs or apertures 114 are formed in the bottom of the housing 64, separated by a bridge 116. The bridge 116 prevents light from the lamp or bulb 62 from directly striking the outer surface of the ring body 56 in a radial direction, while the cut-outs 114 permit light from the lamp 62 to strike the opposite edges of the track 92 adjacent the grooves 94, and thereby to be diffused in circumferentially opposite directions, resulting in a uniform distribution of light along the front flange 58 of the glow ring 54. Preferably a roughening of the rear surface of the flange 58 is provided, to assist in the dispersion of light thorough the front of the flange.

The present construction has an important advantage involving ease of installation, according to the following steps: First the lamp housing 64 is mounted on the glow ring 54 to constitute an initial assemblage. Then suitable electrical leads and receptacles (not shown) are brought out from the rear through the panel opening 12, and connected to terminals 118 of the lamp socket 82 of such assemblage. Thereafter, the assemblage of glow ring 54 and housing 64 is frontally inserted through the aperture 12 of the panel or dashboard 14, with the lamp housing 64 in a relative extended position on the ring. The flat 77 on the ring is positioned to coincide with the flat (not shown) of the panel aperture. By virtue of the extended position of the lamp housing 64 on the glow ring 54, there exists sufficient clearance for such frontal insertion to occur, with only minimal interference between the housing 64 and the walls of the panel aperture 12. As the glow ring part of the assemblage is shifted rearwardly, the tab 65 on the slide 96 of the housing 64 becomes engaged with the edge of the dashboard or panel aperture 12, such engagement causing the housing 64 to be held stationary while the glow ring 54 continues its movement and becomes fully seated; the lamp housing thus finally lodges at a position forwardly of its former extended position with respect to the glow ring. The lamp 62 now underlies the track 92 of the glow ring 54, and provides lighting of the ring flange 58 through the body of the ring 54.

With the present ring 54 fully seated, the tab 65 occupies the small rectangular recess 106 behind the wall of the frontal recess 58 of the ring, as noted above. The ring 54 is temporarily held in position by the engagement of the longitudinal ribs 72, 74 with the edges of the aperture 12.

It is noted that the retracted position of the lamp housing 64 with respect to the ring 54 is illustrated in FIG. 1 in solid outline, whereas the extended position is shown by the dotted outlines to the left of the shoulder 86 in this figure.

Through the use of such a construction involving a slidably mounted lamp housing 64, there is provided sufficient clearance between the lamp housing/glow ring and the aperture 12 in the panel 14 when the lamp housing 64 is extended, to permit insertion of the lamp housing/glow ring into such aperture 12 from the front of the panel.

Following installation of the assemblage comprising the glow ring 54 and housing 64, additional electrical leads and connecting terminals (not shown) are brought out from the rear through the opening in the glow ring and are connected to the respective spade terminals 44 and 48 of the cigar lighter socket 16. The cigar lighter socket 16 is now inserted into the opening of the ring 54 from the front, until the outturned flange 30 thereof arrives at and becomes seated in the front recess 58 of the ring.

During insertion of the socket 16, the fingers 66 are cammed outwardly by engagement of the camming surfaces 68 of the lugs thereof with the socket walls, and their ends arrive at positions behind the edges of the panel aperture 12. Also, the apertures 80 in the walls of the socket 16 arrive at the projections 78 on the inner surface of the ring 54, such projections becoming seated in the apertures. As a consequence, both the lamp housing and glow ring, and the lighter socket are retained in fixed positions, once assembled in the manner described. It has been found that the retention is excellent; the assembly has been found to resist subsequent loosening due to vibration, or due to repeated insertion or removal of the lighter's ignitor plug.

The disclosed device is thus seen to represent a distinct advance and improvement in the field of cigar lighters of the type incorporating an illuminated glow ring.

Variations and modifications are possible without departing from the spirit of the invention.

Each and every one of the appended claims defines an aspect of the invention which is separate and distinct from all others, and accordingly it is intended that each claim be treated as such when examined in the light of the prior art devices in any determination of novelty or validity.

What is claimed is:

1. A cigar lighter assemblage for mounting on a panel through an opening of the panel from the front thereof, comprising in combination:
   (a) a tubular socket having an opening for receiving an igniting unit,
   (b) a light-conducting bushing surrounding said socket and constituting a bezel around the same,
   (c) a lamp holder,
   (d) cooperable means on said bushing and lamp holder for slidably mounting the lamp holder on the bushing between an extended position and a retracted position thereon, and
   (e) means on said lamp holder, engageable with the panel to shift the holder from its extended position to its retracted position as the bushing and holder are being frontally inserted in the opening of the panel.

2. The invention as set forth in claim 1, wherein:
   (a) said cooperable means for slidably mounting the lamp holder comprises means defining a track on the bushing, and
   (b) a slide strip on said lamp holder, movable along said track.

3. The invention as set forth in claim 2, wherein:
   (a) said track has oppositely disposed, facing grooves which receive said slide strip.

4. The invention as set forth in claim 3, wherein:
   (a) said grooves are substantially parallel to one another, and
   (b) said slide strip has substantially parallel opposite edge portions respectively receivable in said grooves.

5. The invention as set forth in claim 1, and further including:
   (a) cooperable keying means on said bushing and tubular socket, for turnably orienting them to a predetermined relative position as they are assembled to one another.

6. The invention as set forth in claim 1, and further including:
   (a) cooperable means on said bushing and tubular socket, for retaining the socket captive on the bushing once the two parts have been assembled to one another.

7. The invention as set forth in claim 6, wherein:
   (a) said cooperable retaining means comprises a radially inwardly extending projection on said bushing, and
   (b) means defining an aperture in the wall of the socket, in which the projection is received when the socket and bushing are assembled.

8. The invention as set forth in claim 7, wherein:
   (a) said inwardly extending projection comprises a tooth, said tooth being formed integral with the wall of the bushing.

9. The invention as set forth in claim 8, wherein:
   (a) said bushing is constituted of resilient material, and said bushing wall being annular,
   (b) said tooth having a camming face that causes the annular wall of the bushing adjacent the tooth to be cammed outwardly as the socket is inserted in the bushing.

10. The invention as set forth in claim 8, wherein:
    (a) said tooth has a retainer surface facing the rear of the bushing, said retainer surface preventing inadvertent removal of the socket from the bushing once the two parts are assembled to one another.

11. The invention as set forth in claim 6, wherein:
    (a) said cooperable retaining means comprises a pair of radially inwardly extending projections on said bushing, and
    (b) means defining a pair of apertures in the wall of the socket, in which the projections are respectively received when the socket and bushing are assembled.

12. The invention as set forth in claim 11, wherein:
    (a) said projections are substantially diametrically opposed to one another.

13. The invention as set forth in claim 11, wherein:
    (a) said apertures are substantially diametrically opposed to one another.

14. The invention as set forth in claim 2, wherein:
    (a) said lamp holder has a pair of light-transmitting openings disposed respectively adjacent opposite longitudinal portions of said track.

15. The invention as set forth in claim 1, and further including:
    (a) cooperable means on said bushing and lamp holder, for permanently retaining the holder on the bushing, once assembled thereto.

16. The invention as set forth in claim 15, wherein:
    (a) said cooperable retaining means comprises a retainer groove in the bushing, and
    (b) a projection on the lamp holder, receivable in the retainer groove and slidable therein as the lamp holder is moved with respect to the said bushing.

17. The invention as set forth in claim 16, wherein:
    (a) the cooperable means for slidably mounting the holder comprises means defining a track on the bushing, and
    (b) a slide strip movable along said track,
    (c) said projection comprising a tooth struck from said slide strip.

18. The invention as set forth in claim 17, wherein:
    (a) said retainer groove is disposed in the said track.

19. The invention as set forth in claim 2, wherein:
    (a) said means for shifting the lamp holder comprises a radially outwardly extending projection on said slide strip, said projection being engageable with the front surface of the panel as the bushing is inserted therein from the front of the panel.

20. The invention as set forth in claim 1, wherein:
    (a) said bushing has a pair of oppositely disposed resilient fingers engageable by the outer surface of the tubular socket when the latter is inserted therein, said fingers being forcibly urged in radially outward directions so as to firmly engage the edges of the opening in the panel and thereby retain both the bushing and socket in position, once installed.

21. The invention as set forth in claim 20, wherein:

(a) said resilient fingers having camming surfaces engaged by the walls of said socket as the latter is inserted in the bushing.

22. The invention as set forth in claim 5, wherein:
(a) said tubular socket has a base, and an insulating slab located on its base,
(b) said slab having a projecting tongue,
(c) the bushing having an annular configuration, and having an internal longitudinal keying groove,
(d) the tongue of said slab being receivable in the keying groove of the bushing when the socket is inserted therein.

23. The invention as set forth in claim 1, and further including:
(a) a lamp socket, and
(b) cooperable means on said lamp holder and lamp socket, for releasably retaining the latter in the lamp holder.

24. The invention as set forth in claim 1, wherein:
(a) said lamp holder comprises a housing constituted of sheet metal.

25. The invention as set forth in claim 24, wherein:
(a) said housing comprises a portion constituted as a single integral piece of sheet metal, stamped from a piece of sheet metal stock.

26. The invention as set forth in claim 23, wherein:
(a) said cooperable retaining means comprises a spring finger on said lamp holder, and means defining an abutment shoulder on said lamp socket, said spring finger engaging the abutment shoulder to thereby hold captive the lamp socket.

27. The invention as set forth in claim 1, wherein:
(a) said bushing has an annular body and a substantially circular front mounting flange,
(b) the rear face of said flange having a roughened surface configuration, tending to disperse light carried by the annular body of the bushing, uniformly about said flange.

28. The invention as set forth in claim 19, wherein:
(a) said bushing has an annular body and a front mounting flange, said flange having a recess in its rear surface,
(b) the recess providing clearance for the projection on the slide strip as the bushing is inserted in the panel.

29. The invention as set forth in claim 1, wherein:
(a) said tubular socket has an outwardly extending mounting flange at its front,
(b) said bushing having an annular body and a front mounting flange, said body having a recess lying radially within the mounting flange,
(c) the mounting flange of the socket being seated in the recess of the bushing when the socket is installed.

30. The invention as set forth in claim 1, wherein:
(a) said bushing has an annular body, and a pair of oppositely-disposed external centering ribs on said body, engageable with edges of the opening of the panel when the bushing is inserted therein, to thereby center the bushing in said opening.

31. The invention as set forth in claim 30, wherein:
(a) said centering ribs have tapered portions at their ends facing the rear of the bushing.

* * * * *